(No Model.) 3 Sheets—Sheet 1.

F. N. DENISON.
ELECTRIC DENTAL MOTOR APPARATUS.

No. 533,445. Patented Feb. 5, 1895.

Witnesses. Inventor.

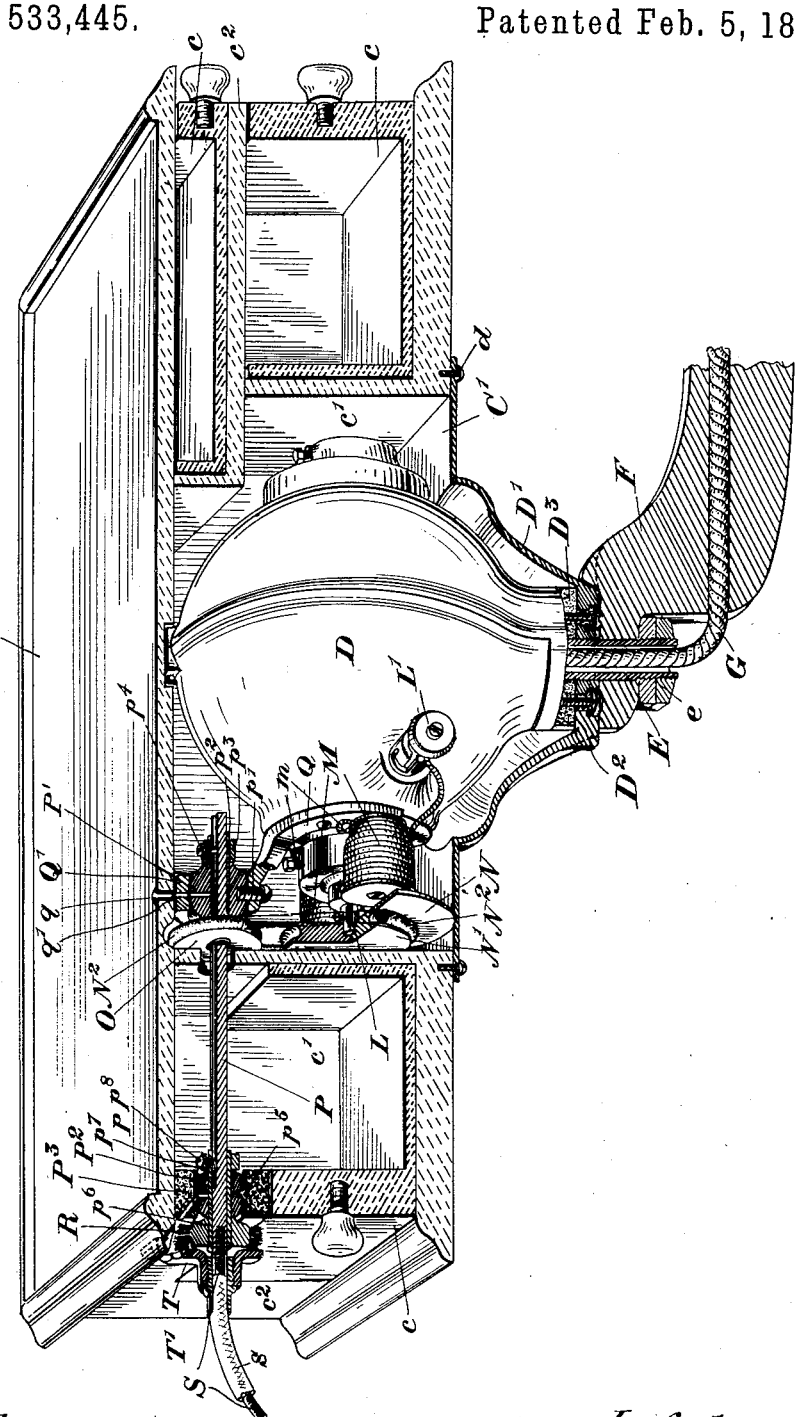

(No Model.) 3 Sheets—Sheet 3.
F. N. DENISON.
ELECTRIC DENTAL MOTOR APPARATUS.
No. 533,445. Patented Feb. 5, 1895.

Witnesses. Inventor.

UNITED STATES PATENT OFFICE.

FRANCIS NAPIER DENISON, OF TORONTO, CANADA.

ELECTRIC DENTAL MOTOR APPARATUS.

SPECIFICATION forming part of Letters Patent No. 533,445, dated February 5, 1895.

Application filed May 26, 1894. Serial No. 512,537. (No model.)

*To all whom it may concern:*

Be it known that I, FRANCIS NAPIER DENISON, electrical expert, of the city of Toronto, in the county of York, in the Province of Ontario, Canada, have invented certain new and useful Improvements in Electric Dental Motor Apparatus, of which the following is a specification.

My invention relates to improvements in electric dental motor apparatus and the object of the invention is to devise a simple, cheap and convenient apparatus, more particularly adapted for dental work in which the motor, switch and various parts of the outfit are under easy control of the operator, and it consists essentially in the construction and arrangement of a swinging table motor, supported within the case of the same, and communicating motion to the dental engine, switches and other parts of the apparatus as hereinafter more particularly explained.

Figure 1:
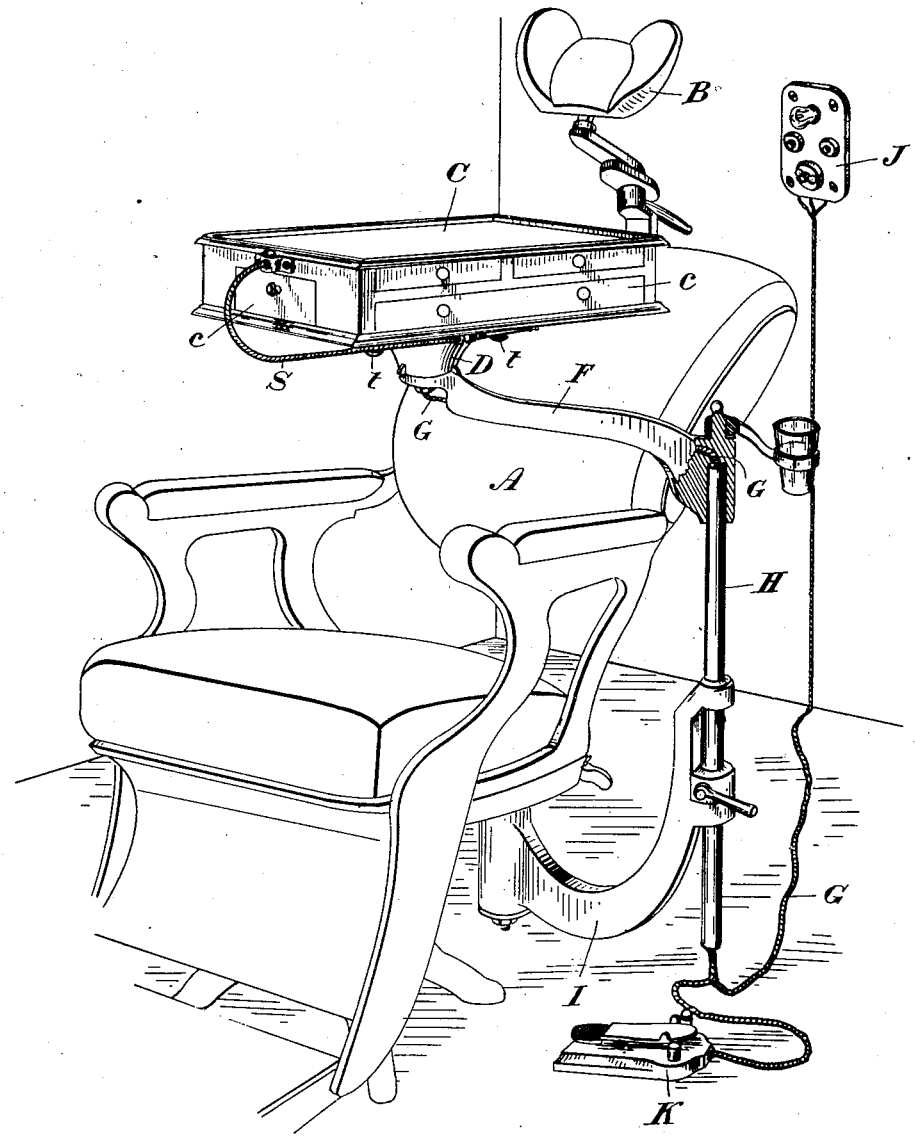
Figures 3, 4:
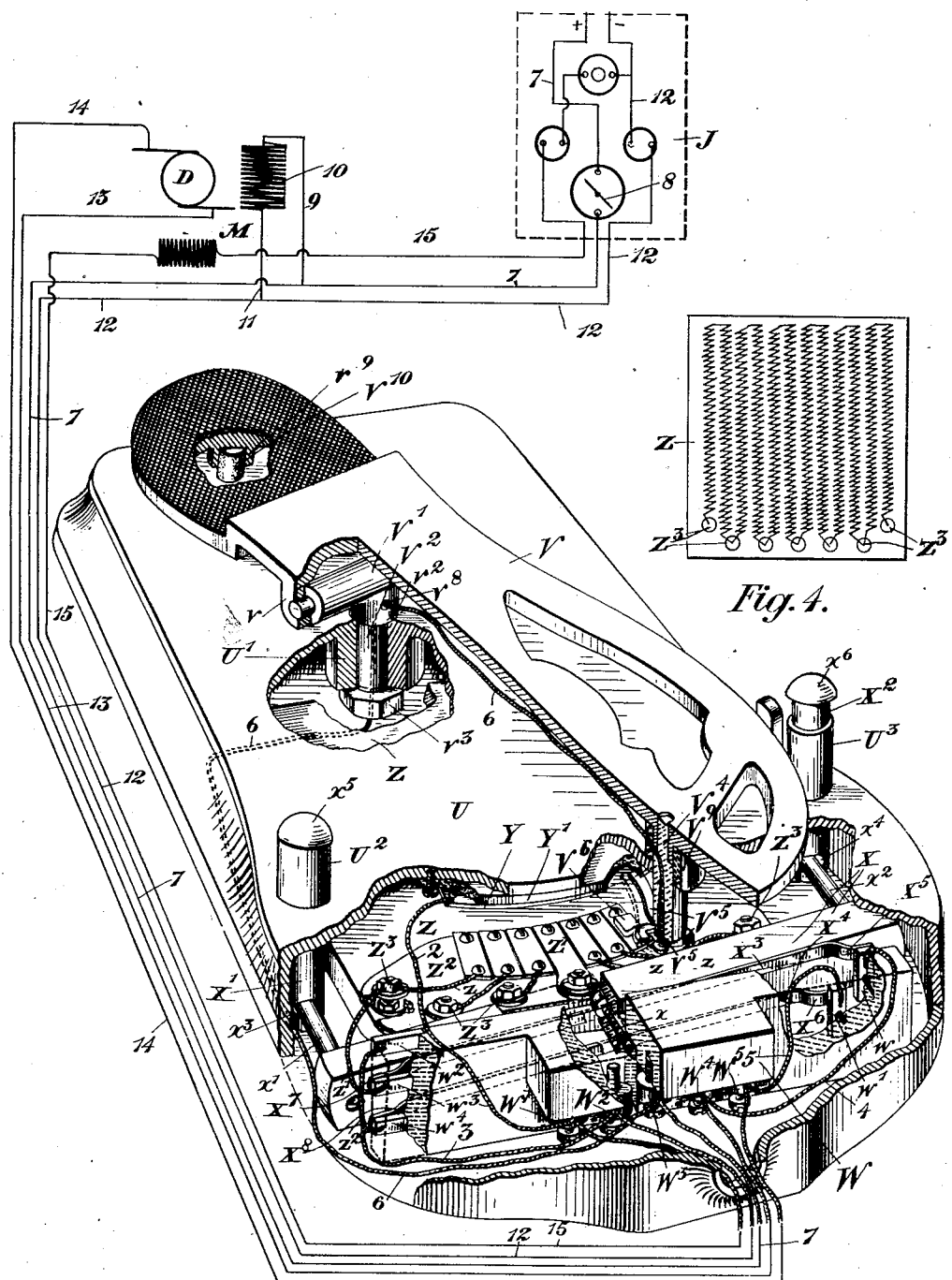

Figure 1, is a perspective view of my electric dental motor apparatus complete as it will appear when attached to the dental chair. Fig. 2, is a longitudinal section through the dental table showing the means for supporting the motor and for journaling the dental engine shaft. Fig. 3, is a view partially in perspective and partially diagrammatic showing wiring, brake, motor, hand and foot switches and their connections, the foot switches being shown in an enlarged perspective view, a portion of the plate or frame of the switch being broken away. Fig. 4, is a plan view of the rheostat.

In the drawings like letters and numerals of reference indicate corresponding parts in each figure.

A, is the dental chair; B, the head rest, and C, the dental table.

The dental table, C, is provided with drawers, $c$, at all sides, extending inwardly into the table so as to leave a central chamber, C'.

D, is an electric motor secured in a suitable casing as indicated in Fig. 2. The motor, D, is located in the chamber, C', and is supported by the casting, D', which is secured at the edge by screws, $d$, to the bottom of the table, the motor being secured to the bottom of the downwardly extending portion of the casting by the screws, $D^2$. The motor is of course, cushioned upon the bottom of the casting by the insulating plate, $D^3$, bushing and washers.

E, is a tube leading from the bottom of the case of the motor and secured in the ends of the bracket, F, by the nut, $e$. The tube, E, forms a pivot upon which the casting, D' and consequently the table, C, turns and also forms a guide for the circuit wires, G.

The circuit wires, G, lead through an opening in the bracket, F, which is swiveled on the top of the tubular standard, H, which is adjustably supported in the usual manner within the bracket, I, attached to the bottom of the chair. The circuit wires, G, lead through the tubular standard, H, to the bottom end from which part diverge and pass to the switch board, J, and the other portion to the adjustable foot switch, K. The construction of the switch board and adjustable foot switch I shall describe hereinafter.

The table, C, has the inner partition, $c'$, and the outer sides, $c^2$.

L, is the main shaft of the motor, and, L', the brush-holder, one of which only is shown.

M, are the magnet coils which form part of the brake the current of which is derived through the wires, $m$.

N, is a disk armature which is made of soft iron and forms part of the pulley, N'. The pulley, N', is longitudinally adjustable upon the motor shaft, L, and when the current is thrown in as hereinafter described in reference to the diagrammatic view the disk armature is drawn toward the magnets so as to almost instantaneously stop the rotation of the motor shaft. The groove pulley, N', is connected by the round belt, $N^2$, to the groove pulley, O, which is suitably keyed to the removable spindle, P.

The spindle, P, has a longitudinal groove, $p$, cut in it extending from near the outer end of the spindle to the inner end thereof. The spindle, P, is held in self-aligning bearings, P', $P^2$.

The self-aligning bearing, P', has an arc-shaped periphery so as to permit it to rock horizontally and is pivoted on the screw, $p'$, so as to permit it to rock vertically, the bearing being supported in the ring shaped end, Q', of the arm, Q, which is secured to the casing of the motor.

$p^2$, is a sleeve which extends through the bearing, Q', and upon which the pulley, O, is primarily secured. $p^3$, is a collar which is secured to the inner end of the sleeve, $p^2$, within the bearing, P'.

$p^4$, is a set screw which extends through the collar, $P^3$, into the longitudinal groove or key slot, $p$, made in the spindle, P.

$q$, is a tubular thimble which extends through the top board of the table, C, and, $q'$, is a passage way as an extension to the tube, $q$, through the self aligning bearing. This passage way is for the purpose of pouring oil in to keep the bearing lubricated.

The self aligning bearing, $P^2$, is constructed in identically the same manner as the bearing, P', having an arc shaped periphery and being pivoted upon the screw, $p^5$. The self aligning bearing is preferably journaled in a rubber ring, $P^3$, having a metallic center so that the sound vibrations caused by the rotation of the shaft will not be carried by the table so as to cause an undue noise.

$p^6$ is a sleeve extending through the self aligning bearing provided with a collar, $p^7$, through which a set screw $p^8$, extends. The set screw, $p^8$, projects into the longitudinal groove or key slot, $p$, of the spindle, P.

R, is the cleaning brush for the points which is secured on the outer end of the sleeve, $p^6$. It will be noticed by the construction adopted that the rotating cleaning brush, R, and pulley, O, will always remain in position in the self aligning bearings and that the central spindle may be withdrawn without disturbing the brush, R, or pulley, O. When the spindle is withdrawn it may be again readily pushed into position so as to rigidly connect the brush, R, and pulley, O, to it, by passing the spindle inwardly so that the set screws, $p^8$, $p^4$, will pass into the logitudinal groove, $p$, when the spindle is pushed home.

S, is the flexible shaft, the inner end of which is soldered into the end of the rigid spindle, P. The flexible shaft, S, has a sleeve, $s$, attached to it which is screwed into the sleeve, T', forming part of the bracket, T.

$t$, are hooks secured to the bottom of the table and designed to support the outer end or dental hand piece of the flexible spindle, S.

By the construction above described it will be seen that the table so constructed, with the motor in the center and the spindle extending out through the end or side of the table will be much more convenient and effective for dental work than any form of dental outfit at present in use. Although I show the counter spindle, P, as driven from the main shaft of the motor it will of course be understood that with a high speed motor, the shaft of the motor might be continued through the side of the table and be just as effective as the means described and shown above.

I shall now describe the system of wiring in relation to the foot switch, switch board and motor referring particularly to Fig. 3. I shall however, first describe the construction of the foot switch.

U, is the base plate of the foot switch which is made hollow as shown, and, V, is the pedal which is stiffly pivoted by the side lugs, $v$, upon the trunnion, V', forming part of the hollow pin, $V^2$, which extends through the boss, U' forming part of the base plate, U. The hollow pin, $V^2$, has a shoulder, $v^2$, at the top which rests upon the base plate, U, and has a threaded bottom end upon which is screwed the nut $v^3$, which is sufficiently tight to hold the pin in position and yet permit the swiveling of the pedal. The trunnion, V' extending through the lugs, $v$, permits of the tilting of the pedal.

$U^2$, $U^3$, are hollow stop pins attached to or forming part of the base plate, U.

W, is a bar of insulating material secured to the bottom of the base plate, U. A great deal of the bar, W, is broken away so as to exhibit details of construction.

X, is a bar of insulating material pivoted at the center by the screw pin, $x$, to the bar, W.

$x'$, $x^2$, are pins which are secured on the ends of the bar, X. The pins $x'$, $x^2$, extend rearwardly into the slots $x^3$ $x^4$, formed at the bottom of the plungers, X', $X^2$. The plungers, X', $X^2$, are preferably provided with convex pushing caps, $x^5$, $x^6$.

$V^4$, is a downwardly extending plug of insulating material secured to the forward end of the pedal. The plug, $V^4$, is surrounded at the top by a ring, $V^9$, of insulating material which is designed to limit the downward movement of the plug.

$v^9$, is a boss formed underneath the heel portion of the pedal, V. The boss, $v^9$, is provided with a rubber cushion, $V^{10}$, which is designed to limit the downward movement of the heel portion of the pedal.

Y, is a contact plate which is secured to the bottom of the base plate, U, and is insulated from it by the plate, Y'.

$V^5$, $V^6$, are spring contact plates rigidly secured at the bottom of the insulating plug, $V^4$, by the screw, $v^5$. The spring plate, $V^5$, is held out of contact with the plate, Y, and the plate, $V^6$, is held out of contact with one of the plates, Z', of the flat rheostat, Z, which is situated beneath the base plate, U, except when the foot switch is pressed either at the toe or heel to throw in the motor or brake—as the case may be. The plates, Z', are separated from each other and are insulated from the rheostat by the plate, $Z^2$.

$Z^3$, are the binding posts of the rheostat which extend through the insulating plate into the rheostat. There is one binding post for each plate and the posts are connected to the plates by the wires, $z$.

$w$, $w'$, are contact blocks secured at one end of the bar W, and, $w^2$, $w^3$, $w^4$, are bars flush with the inner side of the bar.

$X^3$, $X^4$, are contact plates secured to the front side of the pivoted bar, X. The plates, $X^3$, $X^4$, have at one end the spring ends, $X^5$, $X^6$, which are continuously held in contact with the contact blocks, $w$, $w'$, secured to the bar, W, and at the other spring ends, $X^7$, $X^8$, which are designed to be respectively brought in contact with the bars, $w^2$, $w^3$, or $w^3$, $w^4$, as shown in Fig. 3, this depending upon which of the plungers $X'$ or $X^2$, is pressed down.

The rheostat above mentioned in this instance as indicated in Fig. 4, has the greatest amount of resistance at the right hand side, and the resistance decreases from right to left, the left hand binding post having no resistance at all. The left hand binding post, $Z^3$, is connected by the wire $z'$, to the contact bar $w^3$. The bar, $w^2$, is connected to the bar, $w^4$, by the wire, $z^2$.

$W'$, $W^2$, $W^3$, $W^4$, $W^5$, are binding posts of the motor, switch, and switch board circuits, which are secured in the bottom of the bar, W.

2, is a wire connecting the contact plate, Y, with the binding post, $W'$.

3, is a wire connecting the wire, $z^2$, and contact plate, $w^4$, with the binding post, $W^2$.

4, is a wire connecting the contact block, $w$, with the binding post, $W^4$.

5, is a wire connecting the contact block, $w'$, with the binding post, $W^5$.

6, is a wire connected at one end to the screw, $z^5$, and consequently to the contact plates, $V^5$, $V^6$, and extending up through the insulating pin, $V^4$, underneath the pedal through the opening, $v^8$, down through the hollow pin, $V^2$, as indicated by dotted lines, forward to the central binding post, $W^3$.

7, is a positive wire through which, when the switch, 8, is thrown into the position shown in dotted lines, the current passes ordinarily, when the foot switch is not thrown in, through the wire, 9, shunt field, 10, wire, 11, and back by the negative wire, 12.

When the forward end of the pedal of the switch is pressed down the circuit is completed and passes through the positive wire, 7, in to the binding post, $W^3$, thence by the wire, 6, to and through the insulating plug, $v^4$, contact plate, $V^6$, one of the plates, $Z'$, of the rheostat, through the rheostat, finally on the wire, $z$, to the binding post, $Z^3$, at the left hand side of the rheostat, the wire, $z'$, to the contact bar, $w^3$, thence by the contact plate, $X^3$, to the contact block, $w$, thence by the wire, 4, to the binding post, $W^4$, thence by the wire, 13, to the motor, through the motor and by the wire, 14, back to the binding post, $W^5$, from the binding post, $W^5$, by the wire, 5, to the contact block, $w'$, thence by the contact plate, $X^4$, to the contact bar, $w^4$, thence by the wire, 3, to the binding post, $W^2$, thence by the wire, 12, back to and through the switch board, J. The course above described is that shown when the plunger, $X'$, is pressed down and the bar, X, in the position shown in Fig. 3.

It will of course, be understood that the nearer the pedal is swung to the left hand side of the figure so as to bring the contact plate, $V^6$, upon the plates nearer the left hand side, the less the resistance will be (see Fig. 4) and consequently the greater the speed of the motor.

Should the bar, X, be tilted so as to bring the spring ends, $X^7$, $X^8$, of the contact plates, $X^3$, $X^4$, against the bars, $w^2$, $w^3$, the direction of the current will be reversed and the circuit will then be through the wire, 7, binding post, $W^3$, wire, 6, contact plate, $V^6$, rheostat contact plates, $Z'$, wire, Z, binding screw, $Z^3$, to the left hand side of the figure, wire, $z'$, bar, $w^3$, contact plate, $X^4$, wire, 5, binding post, $W^5$, wire, 14, through the motor in the opposite direction, back by the wire 13, post $W^4$ wire, 4, to the contact block, $w$, through the contact plate, $X^3$, bar, $w^2$, wire, $z^2$, wire, 3, and wire, 12, out through the switch board, J. By pressing downwardly upon the heel however, the brake will be thrown in as will be understood from the circuit I shall now describe. The contact plate, $V^5$, in this instance is brought against the contact plate, Y, secured at the bottom of the base plate, U. The current will now pass through the switch board in the same direction along the wire, 7, through the binding post, $W^3$, wire, 6, contact plate, $V^5$, contact plate, Y, wire, 2, to the binding post, $W'$, thence by the wire, 15, to and through the brake, M, out through the switch board.

From this description it will be seen that I provide a very simple and easily controlled apparatus which is not only noiseless but brings all the implements of the dentist close at hand and in a position where they are most convenient for his use.

It will also be seen that the pedal may be left by the foot in such a position that the toe is down and the motor will consequently be running at a speed commensurate with the position in which the pedal is placed.

I also wish to finally draw attention to the simplicity of attachment of the motor within the table as by such connection it will readily be seen that by taking out the screws $d$, from the casting, $D'$, and withdrawing the spindle, P, of the flexible shaft of the dental engine, that the table may be removed so that the motor may be readily inspected or repaired.

What I claim as my invention is—

1. In a dental outfit the combination with the dental table pivoted and swung in proximity to the chair as specified, of an electric motor in a chamber under the central portion of the table between the drawers and having the rigid spindle of the dental engine deriving motion from the motor, journaled in suitable bearings in the inner partition and side of the table and having the flexible shaft of the dental engine extending outwardly from the end of the rigid spindle as and for the purpose specified.

2. In a dental outfit the combination with the dental table pivoted and swung in proximity to the chair as specified, of an electric motor supported in a chamber under the central portion of the table between the drawers by a casting, D', which is secured to the bottom of the table and has a downwardly extending portion to which the bottom of the motor is secured, the downwardly projecting portion resting on the end of the supporting bracket and being secured and pivoted thereon by the tubular bolt, e, as and for the purpose specified.

3. In a dental outfit the combination with the dental table pivoted and swung in proximity to the chair as specified, of an electric motor suitably supported in a chamber under the central portion of the table between the drawers and having a pulley situated on the main shaft which is connected by a belt to a pulley secured to the rigid spindle which is journaled in self-aligning bearings and has the flexible shaft of the dental engine extending from the outside of the table as and for the purpose specified.

4. In a dental outfit the combination with the dental table pivoted and swung in proximity to the chair as specified and an electric motor supported in a chamber under the central portion of the table between the drawers, of a rigid spindle suitably journaled beneath the table, extending outwardly beyond the side, deriving motion from the motor and having the flexible shaft attached to the outer end of the spindle and the cleaning brush secured to the outer end of the rigid spindle as and for the purpose specified.

5. In a dental outfit the combination with the dental table pivoted and swung in proximity to the chair as specified, of the electric motor, D, rigid counter spindle, P flexible shaft, S, pulley, N', on the motor shaft, L, connected by a belt, N$^2$, to the pulley, O, on the counter spindle, P, the brake consisting of an adjustable disk, N, forming part of the pulley, N', and magnets, M, all arranged as and for the purpose specified.

6. The combination with the dental table, C, motor, D, situated in a chamber between the central portion of table between the drawers and having the shaft of the motor connected to the rigid counter spindle, P, as specified, of the self-aligning bearings, P', P$^2$, with arc-shaped peripheries and pivoted at the bottom as specified upon the bracket, Q, and ring, P$^3$, respectively, as and for the purpose specified.

7. The combination with the dental table, the motor and counter spindle driven from the motor as specified, of the pulleys, O, and brush, R, secured on the sleeves, $p^4$, $p^6$, journaled in the self-aligning bearings P', P$^2$, held in position by the collars, $p^5$, $p^7$, respectively, which collars are secured from rotation by the screws, P$^4$, P$^8$, extending into the longitudinal groove or keyed slot, $p$, in the counter spindle, P, as and for the purpose specified.

8. The combination with the dental table and motor suitably supported within a chamber below the central portion of the table and between the drawers by a casting located on the end of the bracket arm, F, the motor communicating motion to the rigid counter spindle, P, and flexible shaft, S, of the dental engine as specified, of the tubular bolt, $e$, bracket, F, swiveled on the tubular standard, H, which is held on the bracket, I, attached to the bottom of the chair the tubular bolt bracket and tubular standard forming a conduit for the circuit wires as and for the purpose specified.

9. The combination with the dental table, C, motor, D, communicating motion to the flexible shaft, S, as specified and supported underneath the central portion of the table between the drawers and pivoted upon the end of the arm, F and standard, H, arranged as specified, the foot switch, K, having a pedal, V, arranged as specified connected to the circuit wires to the motor and brake and the switch board, J, connected by the wires G, to the main circuit wires as shown and for the purpose specified.

10. In a dental outfit the combination with the dental table and motor as specified, of the foot switch, K, consisting of the pedal, V, stiffly pivoted on the trunnion and means whereby upon pressure being applied to the forward end of the pedal, contact is made so as to throw the circuit through the rheostat and motor and when pressure is exerted upon the heel portion of the pedal contact is made and the circuit thrown into the brake as and for the purpose specified.

11. In a dental outfit the combination with the dental table and motor as specified, of the table, V, stiffly pivoted on the trunnion, V', which is swiveled upon the tubular bolt, V$^2$, and means whereby upon the toe of the pedal being depressed contact is made with one or other of the plates of the rheostat so that the resistance is decreased as the pedal is depressed and swung to the left so as to increase the speed of the motor as and for the purpose specified.

12. The combination with the foot pedal pivoted, swiveled and making contact as specified, of the stops, U$^2$, U$^3$, arranged as and for the purpose specified.

13. The combination with the foot pedal pivoted, swiveled and making contact as specified, of the insulating plug, V$^4$, provided with an insulating ring, V$^9$, arranged as and for the purpose specified.

14. The combination with the foot pedal pivoted, swiveled and making contact as specified, of the boss, $v^9$, extending downwardly from the bottom of the heel portion and provided with a rubber cushion V$^{10}$, arranged as and for the purpose specified.

15. The combination with the pedal stiffly pivoted and swiveled upon the tubular bolt, V$^2$, as specified, of the insulating plug, V$^4$, having connected to its lower end the spring contact plate, V$^5$, which is designed to be brought against the plate, Y, and means whereby the circuit is completed from the plate, Y, to the brake as and for the purpose specified.

16. The combination with the foot pedal pivoted, swiveled and making contact as specified, of the plug, $v^9$, having connected to its lower end the spring plate, $V^6$, which is designed to be brought against one of the plates, $Z'$, of the rheostat and means whereby the main circuit is completed from the plate through the rheostat to and through the motor as and for the purpose specified.

17. The combination with the pedal stiffly pivoted and swiveled upon the tubular bolt, $V^2$, as specified, of the insulating bar, W, provided with metal contact bars, $W^2$, $W^3$, $W^4$, and contact blocks, $W$, $W'$, and the pivoted insulating bar X, provided with spring contact plates, $X^3$, $X^4$, the right hand ends, $x^5$, $x^6$ of which are designed to be held in continuous contact with the blocks, $w$, $w'$, while the left hand ends are designed to be brought either in contact with the bars, $w^3$, $w^4$, or $w^2$, $w^3$, according to whether the plunger $X'$, connected to the bar, $x$, by the pin, $v$, or plunger, $X^2$, connected to the bar, $x$, by the pin, $x^2$, is depressed and means whereby upon the toe of the pedal being depressed the circuit is thrown through either of the two courses so as to change the direction of the rotation of the motor by the depression of either the plungers, $X'$ or $X^2$, as and for the purpose specified.

18. The combination with the pedal stiffly pivoted and swiveled upon the tubular bolt, $V^2$, as specified, of the insulating bar, W, provided with the metal contact bars $w^2$, $w^3$, $w^4$, and contact blocks, $w$, $w'$, and the pivoted insulating bar, X, provided with spring contact plates, $X^3$, $X^4$, the right hand ends, $x^5$, $x^6$ of which are designed to be held in continuous contact with the blocks, $w$, $w'$, while the left hand ends are designed to be brought either in contact with the bars, $w^3$, $w^4$, or $w^2$, $w^3$, the plungers, $X'$, connected to the bars, X the rheostat arranged with the separate plates the contact plate, $V^6$, secured in the end of the insulating block, $V^4$, circuit wire, 7, binding post, $W^3$, wire, 6, contact plate, $V^6$, rheostat with contact plates, $Z'$, wire, $z$, binding post, $z^3$, wire, $z'$, spring contact plate, $x^3$, contact block, $w$, wire, 4, binding post, $W^4$, wire, 13, motor, D, wire, 14, binding post, $W^5$, wire, 5, contact block, $w'$, spring contact plate, $X^4$, contact bar, $w^4$, wire, 3, binding post, $W^2$, wire, 12, all arranged as and for the purpose specified.

19. The combination with the pedal stiffly pivoted and swiveled upon the tubular bolt, $V^2$, as specified, of the wire, 7, binding post, $W^3$, wire, 6, extending through the insulating plug, $V^4$, contact plate, $V^5$, plate, Y, insulated from the base plate, U, wire, 2, binding post, $W'$, wire, 15, and bracket, M, all arranged as and for the purpose specified.

FRANCIS NAPIER DENISON.

Witnesses:
  E. R. CASE,
  V. J. WITHROW.